(12) United States Patent
Roussy

(10) Patent No.: US 8,136,611 B2
(45) Date of Patent: *Mar. 20, 2012

(54) METHOD AND SYSTEM FOR INSTALLING MICROPILES WITH A SONIC DRILL

(76) Inventor: Raymond Roussy, Surrey (CA)

( * ) Notice: Subject to any disclaimer, the term of this patent is extended or adjusted under 35 U.S.C. 154(b) by 351 days.

This patent is subject to a terminal disclaimer.

(21) Appl. No.: 12/543,743

(22) Filed: Aug. 19, 2009

(65) Prior Publication Data

US 2010/0040419 A1 Feb. 18, 2010

Related U.S. Application Data

(63) Continuation-in-part of application No. 11/896,945, filed on Sep. 6, 2007, now Pat. No. 7,647,988, which is a continuation-in-part of application No. 11/067,225, filed on Feb. 28, 2005, now abandoned.

(51) Int. Cl.
*E21B 7/24* (2006.01)
*E02D 7/26* (2006.01)

(52) U.S. Cl. ............... 175/56; 175/171; 405/244

(58) Field of Classification Search ............ 175/55, 175/56, 57, 171; 405/244
See application file for complete search history.

(56) References Cited

U.S. PATENT DOCUMENTS

| | | |
|---|---|---|
| 1,681,883 A | 8/1928 | Sipe |
| 2,123,364 A | 7/1938 | Katterjohn |
| 2,776,113 A | 1/1957 | Reh |
| 2,893,692 A | 7/1959 | Marx |
| 2,942,849 A | 6/1960 | Bodine |
| 3,023,820 A | 3/1962 | Desvaux et al. |
| 3,467,207 A | 9/1969 | Pyles et al. |
| 3,604,214 A | 9/1971 | Turzillo |
| 3,786,874 A | 1/1974 | Jodet et al. |
| 3,815,368 A | 6/1974 | Turzillo |
| 3,866,693 A | 2/1975 | Century |
| 3,886,754 A | 6/1975 | Turzillo |
| 3,962,879 A | 6/1976 | Turzillo |
| 4,286,651 A | 9/1981 | Steiger et al. |
| 4,645,017 A | 2/1987 | Bodine et al. |
| 4,705,118 A | 11/1987 | Ennis |
| 5,009,272 A | 4/1991 | Walter |

(Continued)

FOREIGN PATENT DOCUMENTS

CN 2047717 U 11/1989

(Continued)

OTHER PUBLICATIONS

U.S. Appl. No. 12/327,973, Raymond Roussy.

(Continued)

*Primary Examiner* — Giovanna Wright
(74) *Attorney, Agent, or Firm* — Berenato & White, LLC

(57) ABSTRACT

Disclosed is a method for drilling a cased hole and installing a micropile. A sonic drilling apparatus is positioned at a desired location. The sonic drilling apparatus includes a rotating and vibrating apparatus for rotating and vibrating a drill string into the ground. The cased hole is drilled to a desired depth by rotating and vibrating the hollow drill string into the ground while discharging fluid into the inner space of the hollow drill string. A micropile is then lowered into the cased hole. Grouting material may be discharged into the cased hole before or after the drill string is removed from the ground.

8 Claims, 19 Drawing Sheets

U.S. PATENT DOCUMENTS

| | | | |
|---|---|---|---|
| 5,027,908 | A | 7/1991 | Roussy |
| 5,409,070 | A | 4/1995 | Roussy |
| 5,417,290 | A | 5/1995 | Barrow |
| 5,533,356 | A | 7/1996 | DeMasters |
| 5,590,715 | A | 1/1997 | Amerman |
| 5,634,515 | A | 6/1997 | Lambert |
| 5,642,964 | A | 7/1997 | DeMasters |
| 6,000,459 | A | 12/1999 | Jeppesen |
| 6,112,833 | A | 9/2000 | Lambert |
| 6,663,321 | B1 | 12/2003 | Bisschops |
| 6,672,371 | B1 | 1/2004 | Amerman |
| 6,955,219 | B2 | 10/2005 | Johnson, Jr. |
| 7,093,657 | B2 | 8/2006 | Johnson, Jr. |
| 7,270,182 | B2 | 9/2007 | Johnson, Jr. |
| 2003/0221870 | A1 | 12/2003 | Johnson, Jr. |
| 2006/0191719 | A1 | 8/2006 | Roussy |
| 2008/0083565 | A1 | 4/2008 | Roussy |
| 2009/0065255 | A1 | 3/2009 | Roussy |
| 2009/0214299 | A1* | 8/2009 | Roussy ................ 405/239 |

FOREIGN PATENT DOCUMENTS

| | | |
|---|---|---|
| GB | 2436582 | 10/2007 |
| WO | WO93/16236 | 8/1993 |
| WO | WO 93/16236 | 8/1993 |
| WO | WO 99/63282 A1 | 12/1999 |
| WO | WO 2005/003648 | 1/2005 |
| WO | WO 2006/089400 A1 | 8/2006 |

OTHER PUBLICATIONS

U.S. Appl. No. 12/035,776, Raymond Roussy.

"Ground Storage of Energy in Buildings" Arup.com. <http://arup.com/geotechnic/feature.cfm?pageid=662>.

"Energy Piles". Skanska.co.uk. <http://www.skansa.co.uk/skansa/templates/page.asp?id=9755>.

"Skanska Technical Data Sheet". Skanska.co.uk. May 4, 2006. <http://www.skansa.co.uk/index.asp?id=2849>.

Koene, Frans and Geelen Charles. "Energy piles as an efficient way to store heat". CADDET Energy Efficiency. 2000. <http://www.caddet.org/public/uploads/pdfs/newsletter/00s_01.pdf>.

Sanner, Burkhard. "Shallow Geothermal Energy." Geo-Heat Center Bulletin. Jun. 2001. <http://geoheat.oit.edu/bulletin/bull22-2/art4.pdf>.

Armour, Tom A., P.E. "Micropiles for Earth Retention and Slope Stabilization." ADSC: The Interational Association of Foundation of Drilling.

Fitzgerald, Curt and Lewis, Dwayne. Installation of Drilled Cased Micropiles using Low Mobility Grout. Presented at the Great Lakes Geotechnical/Geoenvironmental Engineering Conference on May 7, 2004.

* cited by examiner

METHOD AND SYSTEM FOR INSTALLING MICROPILES WITH A SONIC DRILL

CROSS-REFERENCE TO RELATED APPLICATIONS AND CLAIM TO PRIORITY

The present application is a Continuation-in-part of application Ser. No. 11/896,945, filed Sep. 6, 2007, now U.S. Pat. No. 7,647,988, which application is a Continuation-in-part of 11/067,225 filed Feb. 28, 2005, now abandoned, the disclosures of each of which are incorporated by reference and to which priority is claimed.

BACKGROUND OF THE INVENTION

This invention relates to micropiles and, in particular, to a method of installing micropiles with a sonic drill.

Geothermal heat exchange systems and underground thermal energy storage systems are environmentally friendly, energy efficient, heating and cooling systems. Accordingly, there is a rising demand for such systems for both commercial and residential properties. There is therefore a need for a quick and efficient method of installing the geothermal transfer apparatuses used in many geothermal heat exchange systems and underground thermal energy storage systems. There is also a need for a quick and efficient method of installing underground support structures such as micropiles and anchors which support the buildings housing the heating and cooling systems.

SUMMARY OF THE INVENTION

It is an object of the present invention to provide a method and system which allows for cased holes to be drilled quickly, and in lithologies that are often difficult for conventional drill rigs to drill, thereby allowing for easier installation of micropiles.

It is also an object of the present invention to provide a method which allows for more accurate control and monitoring of the grouting process during the installation of micropiles.

There is accordingly provided a method for drilling a cased hole and installing a micropile. In one embodiment of the method, a sonic drilling apparatus is positioned at a desired location. The sonic drilling apparatus includes a rotating and vibrating apparatus for rotating and vibrating a hollow drill string into the ground. The cased hole is drilled to a desired depth by rotating and vibrating the hollow drill string into the ground while simultaneously discharging fluid into the inner space of the hollow drill string. A micropile is then lowered into the cased hole. Grouting material may be discharged into the cased hole before or after the drill string is removed from the ground.

Also provided is a system which allows for cased holes to be drilled quickly and in lithologies that are often difficult for conventional drill rigs to drill in, thereby allowing for easier installation of micropiles.

DESCRIPTION OF THE PREFERRED EMBODIMENTS

Figure 1:
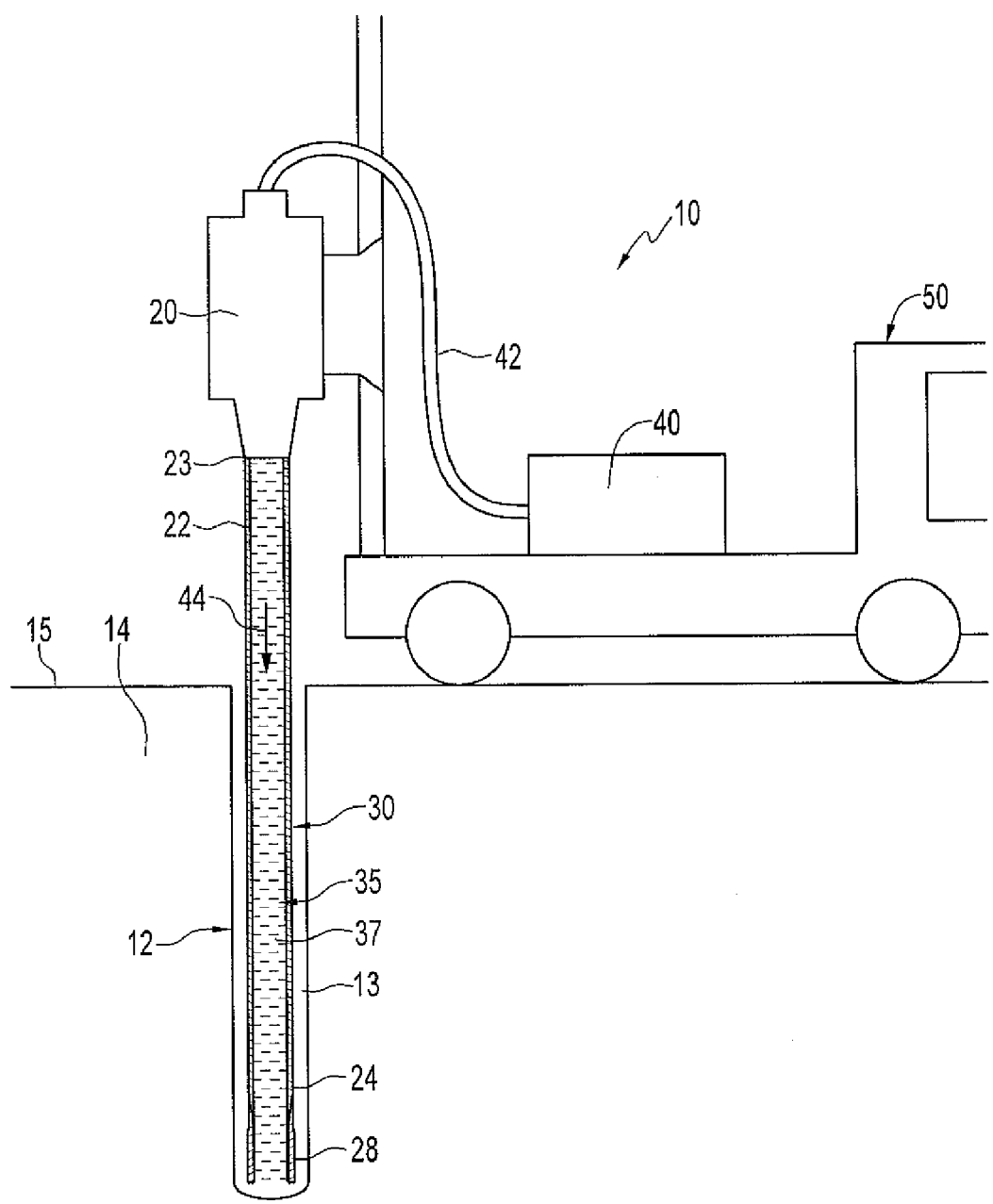
FIG. 1 is an elevation, partially in section, view illustrating a sonic drilling rig drilling a cased hole.

Referring to the drawings, and first to FIG. 1, this shows a drilling rig 10 drilling a cased hole 12 into the ground 14. The drilling rig 10 generally comprises a drilling apparatus 20 mounted on a movable vehicle 50. The vehicle 50 is at a desired drilling location on the ground surface 15 and the drilling apparatus 20 is in a desired drilling position. A drill pipe 22 is operatively connected to the drilling apparatus 20. The drill pipe 22 is hollow and open at both ends. A proximal end 23 of the drill pipe 22 is threadedly connected to the drilling apparatus 20. A distal end 24 of the drill pipe 22 is threadedly connected to a drill bit 28. In this example, the drill bit 28 is a ring bit which is concentric with the drill pipe 22. The combination of the drill pipe 22 and the drill bit 28 forms an open ended drill string 30. There is a cavity or inner space 35 defined by the drill string 30.

In this example, the drilling apparatus 20 is a rotary and vibratory apparatus in the form of a sonic drill. Sonic drills are well known in the art and examples of sonic drills are described in my earlier U.S. Pat. Nos. 5,027,908 and 5,409,070, the complete disclosures of which are incorporated herein by reference. Accordingly, the drilling apparatus 20 is not described in more detail herein. The drilling apparatus 20 rotates and vibrates the drill string 30 into the ground 14. A hose 42 hydraulically connects a pump apparatus 40 to the drilling apparatus 20. During the drilling process pressurized fluid is pumped by the pressurized fluid pump apparatus 40 along the hose 42, through the drilling apparatus 20, and into the inner space 35 of the drill string 30 as indicated by arrow 44.

Figure 2:
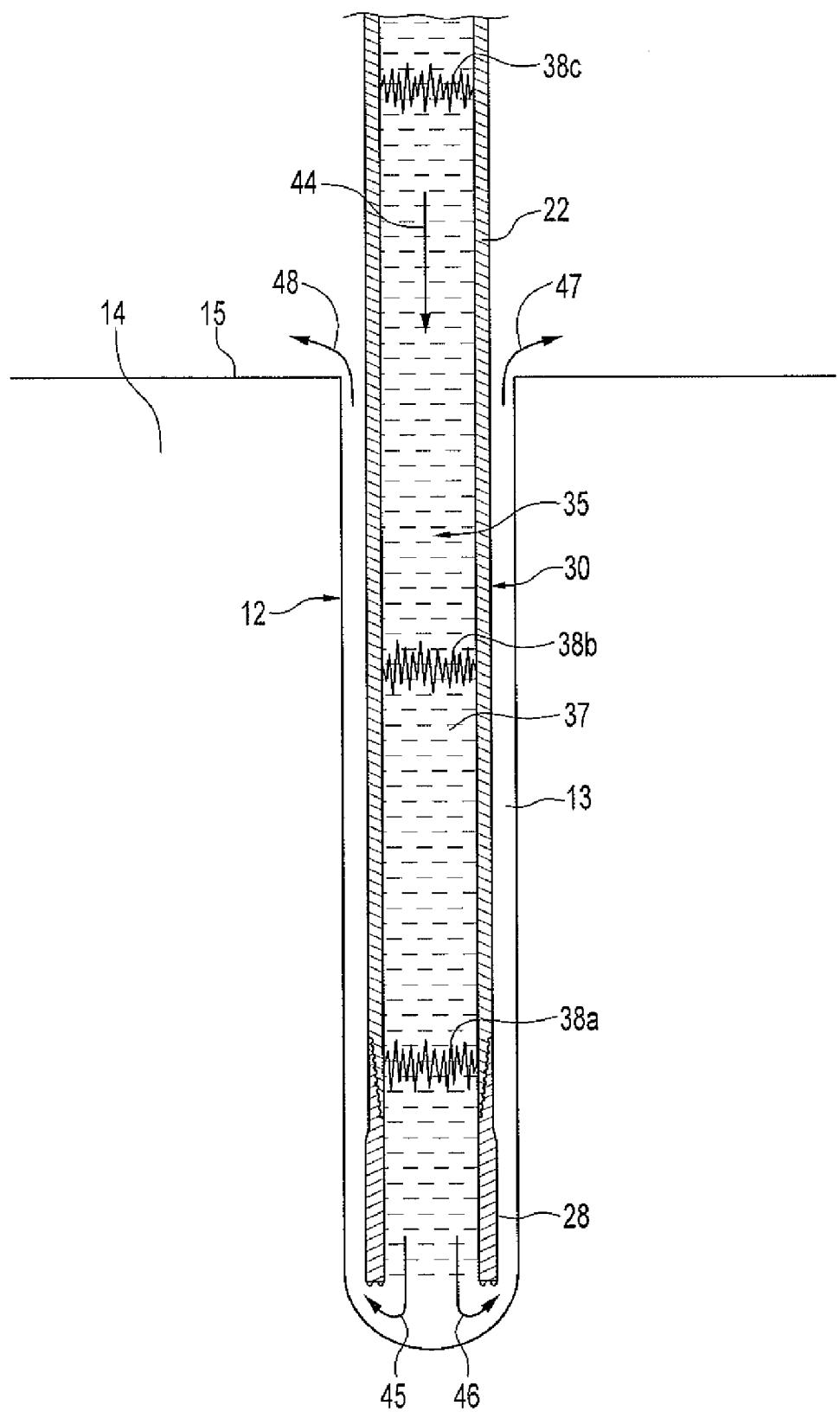
FIG. 2 is an elevation, cross-sectional, view illustrating pressurized fluid being discharged into the hole of FIG. 1.

As best shown in FIG. 2, a fluid column 37 fills the inner space 35 of the drill string 30 and acts as a plug to impede the entry of ground materials into the inner space 35 of the drill string 30. The diameter of the hose 42 is less than the diameter of the inner space 35 of the drill string 30. This prevents the pressurized fluid from being pushed back through the hose in response to high pressure spikes 38a, 38, and 38c created when the pressurized fluid impacts the ground 14 at the bottom of the hole 12. The vibrating drill string 30 causes the fluid column 37 to oscillate at the same frequency as the drill string 30. The pressure spikes 38a, 38, and 38c thus created cause the fluid column 37 to act in a manner similar to a water hammer, thereby adding an additional drilling force.

At minimum, sufficient pressurized fluid is pumped into the inner space 35 of the drill string 30 to form the fluid column 37 which impedes the entry of ground debris into the inner space 35 by pushing the debris into the ground. However, as shown in FIG. 2, additional pressurized fluid may be pumped into the inner space 35 in order to carry ground debris and cuttings up an annulus 13, between the drill string 30 and the hole 12, to the ground surface 15. Arrow 44 indicates the direction of the flow of pressurized fluid into the ground 14 through the inner space 35 of the drill string 30. The excess pressurized fluid is pushed down and around the drill bit 28 and up the annulus 13, towards the ground surface 15 as indicated by arrows 45 and 46. The pressurized fluid carries ground debris and cuttings as it moves up the annulus 13 to the ground surface 15 where the pressurized fluid and cuttings are expelled from the hole 12 as indicated by arrows 47 and 48. In this example, the pressurized fluid is water, but water with added components such as polymer or clay may also be used. The pressurized fluid has a pressure range of between 100-5000 psi, with the preferred pressure range being between 500-2000 psi.

Additional drill pipes (not shown) may be added in sequence to the drill string 30. Each additional drill pipe has a first end and a second end. The additional drill pipes are hollow and open at both ends. First ends of the additional drill pipes are threadedly connected to the drilling apparatus 20 and second ends of the additional drill pipes are threadedly connected to the drill string 30. The additional drill pipes may then be rotated and vibrated into the ground to increase the depth of the hole 12. The additional drill pipes may be added manually or with an automated drill pipe handling apparatus.

Figure 3:
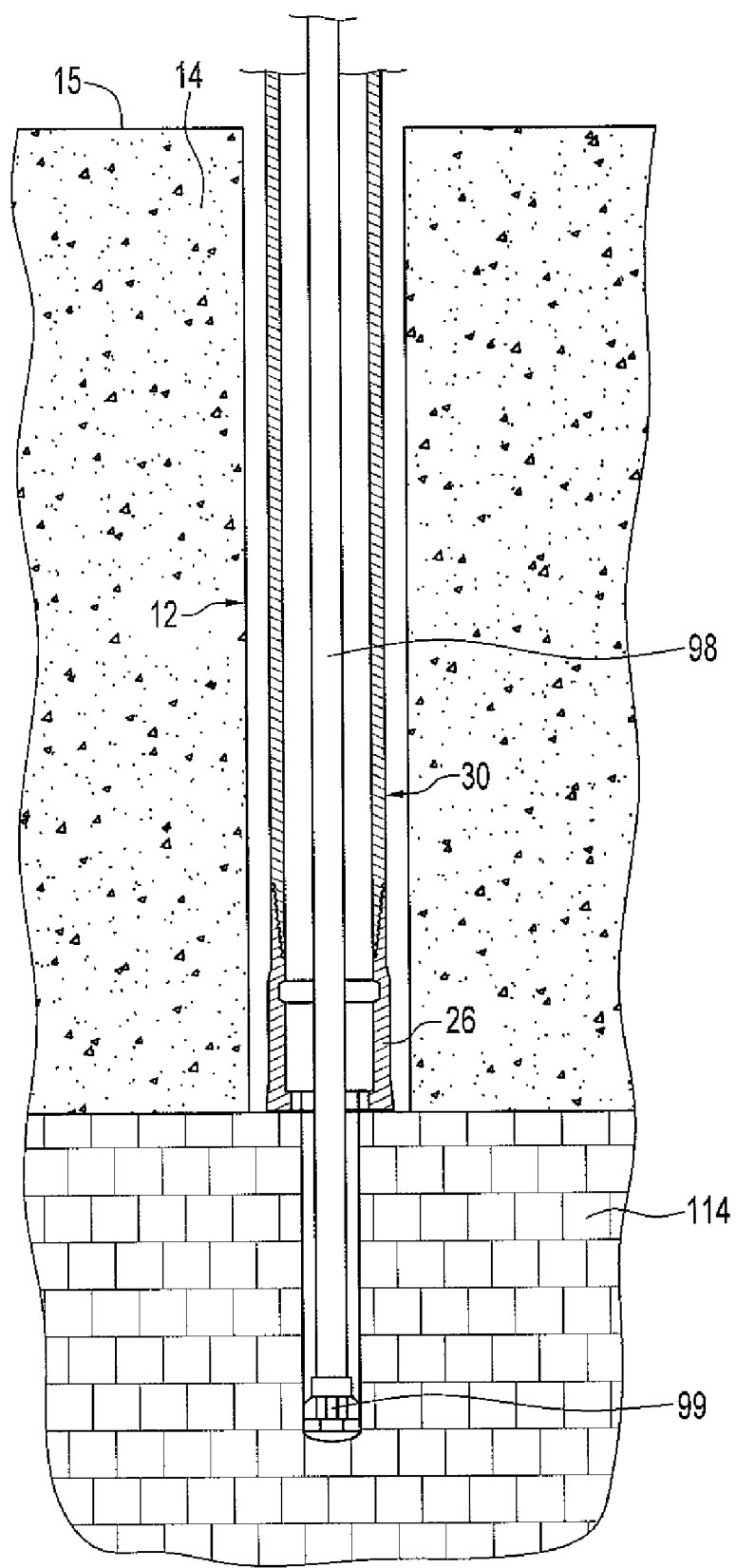
FIG. 3 is an elevation, partially in section, view illustrating a downhole hammer drilling a hole into a bedrock formation.

It will be understood by a person skilled in the art that variations may be made to the drilling process without departing from the scope of the method disclosed herein. For example, as shown in FIG. 3, in situations where bedrock 114 impedes the drilling process, a downhole hammer apparatus 98 with a downhole drill bit apparatus 99 may be used to hammer into the bedrock 114 in order to drill the hole 12 to the desired depth.

Figure 4:
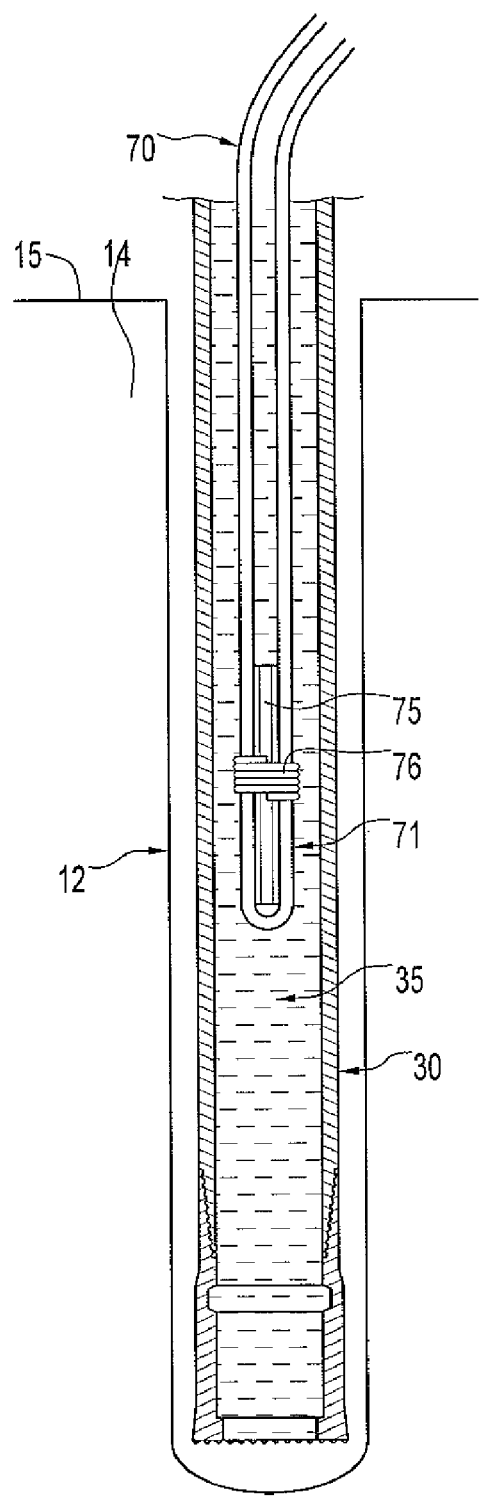
FIG. 4 is an elevation, cross-sectional, view illustrating a geothermal transfer loop being lowered into the hole of FIG. 1.

Once the hole is drilled, a geothermal transfer apparatus, which is capable of transferring heat to and from the ground 14, is then lowered into the cased hole 12 through the inner space 35 of the drill string 30. The geothermal transfer apparatus may be a geothermal transfer loop 70 as shown in FIG. 4. Preferably, the geothermal transfer loop 70 is filled with fluid prior to being lowered into the hole 12. In this example, the geothermal transfer loop 70 is a high density polyethylene tube filled with water. The fluid adds weight to the geothermal transfer loop 70 and prevents the geothermal transfer loop 70 from collapsing in any fluid column that may remain in the hole 12.

Weights 75 may also be attached to the geothermal transfer loop 70 to facilitate the lowering of the geothermal transfer loop 70 into the hole 12. A lead portion 71 of the geothermal transfer loop 70 may further be straightened to facilitate the lowering of the geothermal transfer loop 70, and aid in keeping the geothermal transfer loop 70 at the bottom of the hole 12 during the grouting process and withdrawal of the drill string 30. In this example, the weight 75 is an elongated piece of steel bar that has been attached to the lead portion 71 of the geothermal transfer loop 70 with wiring 76. The steel bar performs the dual function of a weight and a means for straightening the lead portion 71 of the geothermal transfer loop 70. Once the geothermal transfer loop 70 has been completely lowered into the hole 12, the hole 12 is grouted. The hole 12 maybe grouted with the drill string 30 remaining in the ground 14 or after the drill string 30 has been removed from the ground.

It is known to use geothermal transfer loops in geothermal heat exchange systems as is disclosed in my co-pending United States Patent Application Publication Number 2006/0191719 A1, the complete disclosure of which is incorporated herein by reference, and in which a geothermal transfer loop is coupled to a heat pump. Accordingly, the present method provides an improved means for installing geothermal transfer loops.

Figure 5:
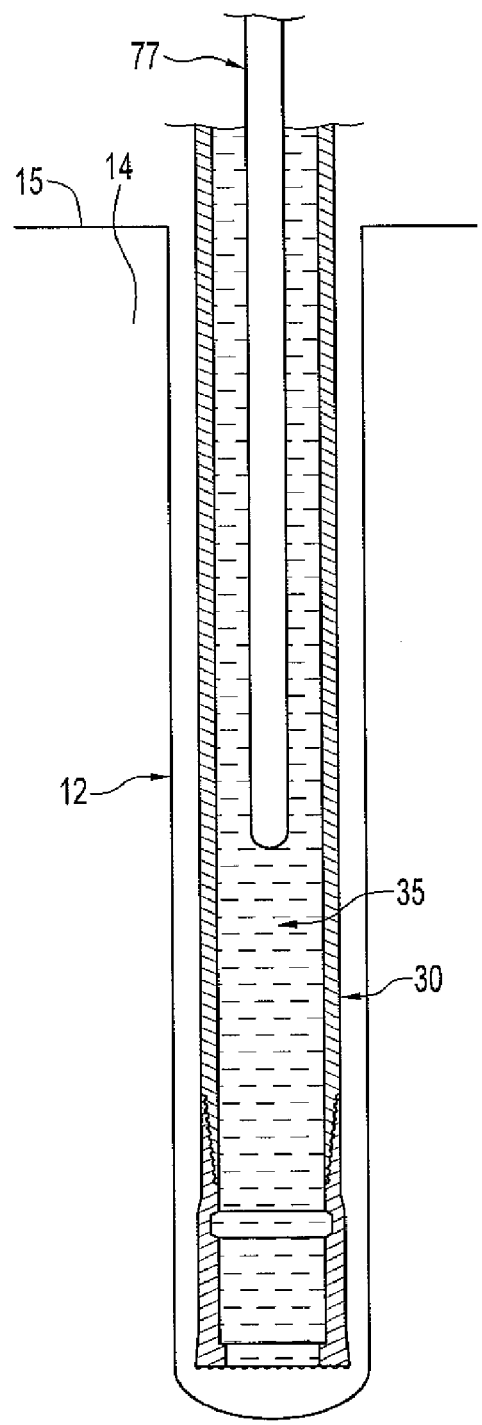
FIG. 5 is an elevation, cross-sectional, view illustrating a co-axial geothermal transfer apparatus being lowered into the hole of FIG. 1.
Figure 6:
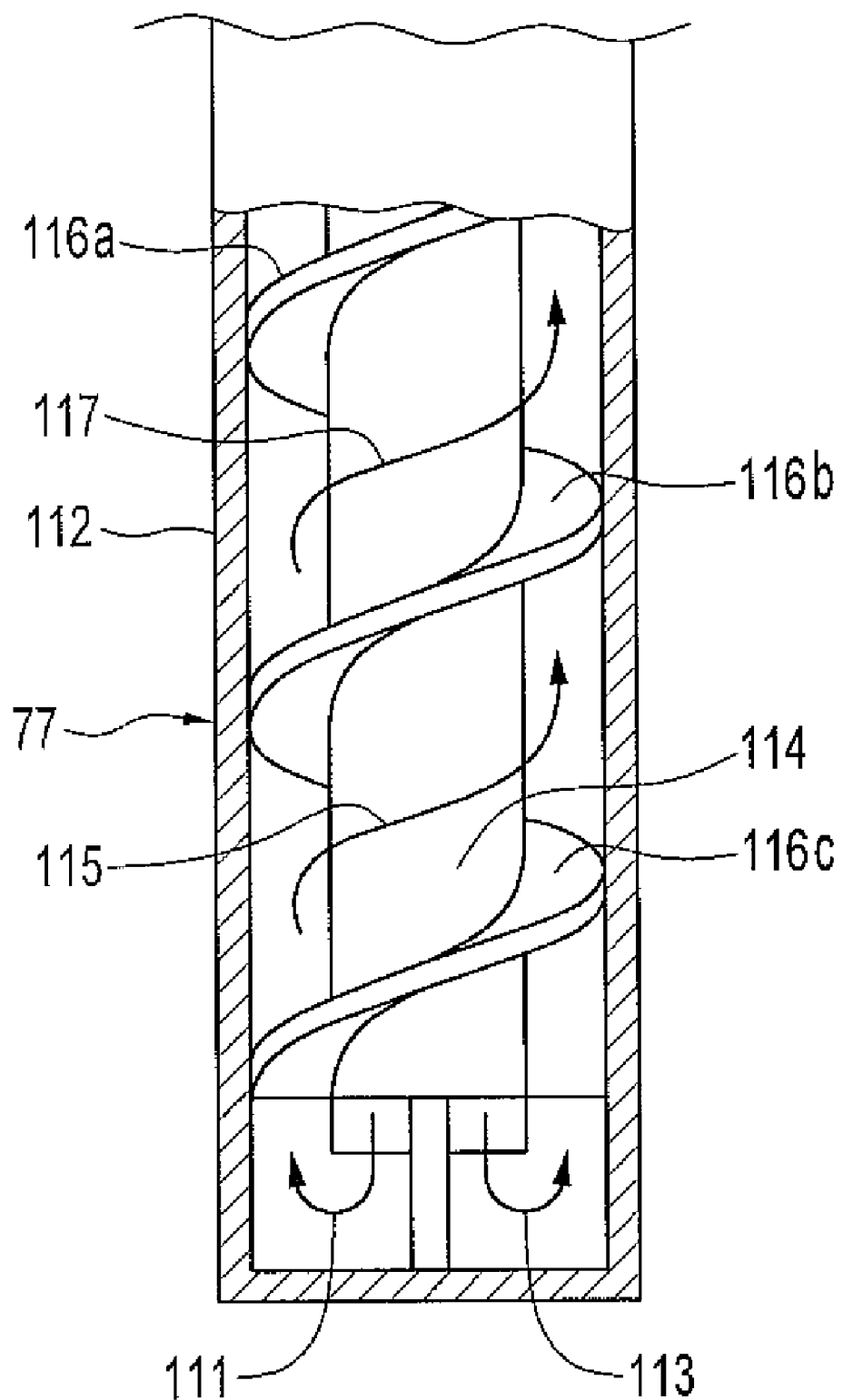
FIG. 6 is a fragmentary, partially in section, view of the co-axial geothermal transfer apparatus of FIG. 5.

Alternatively, the geothermal transfer apparatus may be a co-axial geothermal transfer apparatus 77 as shown in FIGS. 5 and 6. The co-axial geothermal transfer apparatus 77 shown in FIGS. 5 and 6 is similar to the type disclosed in U.S. Pat. No. 7,347,059 to Kidwell et al., the complete disclosure of which is incorporated herein by reference. As shown in FIG. 6, the co-axial geothermal transfer apparatus 77 comprises an outer, thermally-conductive, conduit 112 and an inner conduit 114 disposed within the outer conduit 112. The inner conduit 114 has a plurality of connected fins 116a, 116b and 116c which form a spiral annular flow channel between the inner conduit 114 and the outer conduit 112. In operation, fluid is pumped from the ground surface down the inner conduit 114 where it exits at a distal end of the inner conduit 114 as indicated by arrows 111 and 113. The fluid then flows along the annular flow channel back up to the ground surface as indicated by arrows 115 and 117. The circulating fluid allows for heat transfer between the ground and an ambient environment.

It is known to use coaxial-flow geothermal transfer apparatuses in geothermal heat exchange systems as is disclosed in U.S. Pat. No. 7,363,769 and continuations thereof to Kidwell et al., the complete disclosures of which are incorporated herein by reference, and in which a co-axial geothermal transfer apparatus is coupled to a heat pump. Accordingly, the present method provides an improved means for installing coaxial-flow geothermal transfer apparatuses.

In other examples, the geothermal transfer apparatus may be a superconduting heat transfer device similar to the type disclosed in U.S. Pat. Nos. 6,132,823 and 6,911,231 to Qu, the complete disclosures of which are incorporated herein by reference. Superconducting heat transfer devices allow for bi-directional heat transfer to and from the ground. The superconducting heat transfer devices disclosed by Qu generally includes a substrate, in the form of a conduit, which carries a superconducting heat transfer medium. The superconducting heat medium is applied to an inner surface of the conduit in three basic layers, the first two being prepared from solution and the third being a powder.

The first layer of the superconducting heat medium comprises at least one compound selected from the group consisting of sodium peroxide, sodium oxide, beryllium oxide, manganese sesquioxide, aluminum dichromate, calcium dichromate, boron oxide, and a dichromate radical. The first layer of the superconducting heat medium is absorbed into the inner surface of the conduit and is an anti-corrosion layer which prevents etching on the inner surface of the conduit. In theory the first layer also causes re-alignment of the atomic apparatus of the material comprising the conduit so that heat may be more readily absorbed. A further function of the first layer is to prevent the inner surface of the conduit from producing oxides as oxidation of the inner surface of the conduit will cause heat resistance.

The second layer of the superconducting heat medium comprises at least one compound selected from the group consisting of cobaltous oxide, manganese sesquioxide, beryllium oxide, strontium chromate, strontium carbonate, rhodium oxide, cupric oxide, β-titanium, potassium dichromate, boron oxide, calcium dichromate, manganese dichromate, aluminum dichromate, and a dichromate radical. The second layer of the superconducting heat medium prevents the production of elemental hydrogen and oxygen thus restraining oxidation between the oxygen atoms and the atoms of the material comprising the conduit. In theory the second layer conducts heat across the inner conduit surface. A further function of the second layer is to assist in accelerating molecular oscillation and friction associated with the third layer of the superconducting heat medium so as to provide a heat pathway for conduction.

The third layer of the superconducting heat medium comprises at least one compound selected from the group consisting of denatured rhodium oxide, potassium dichromate, denatured radium oxide, sodium dichromate, silver dichromate, monocrystalline silicon, beryllium oxide, strontium chromate, boron oxide, sodium peroxide, β-titanium, and a metal dichromate. The third layer of the superconducting heat medium is believed to generate heat once the superconducting heat medium is exposed to a minimum activation temperature. Upon activation, atoms in the third layer of the superconducting heat medium begin to oscillate in concert with atoms in the first and second layers of the superconducting heat medium. Experimentation has shown when such a superconducting heat medium is properly disposed on a substrate it has a thermal conductivity that is generally 20,000 times higher than the thermal conductivity of silver.

It is known to use geothermal transfer apparatuses comprising a thermal superconducting medium in geothermal heat exchange systems as is disclosed in co-pending U.S. Pat. No. 7,451,612 to Mueller et al., the complete disclosure of which is incorporated herein by reference, and in which a geothermal transfer apparatus comprising a thermal superconducting medium is coupled to a heat pump. Accordingly, the present method also provides an improved means of installing geothermal transfer apparatuses comprising a thermal superconducting medium and which are used in geothermal heat exchange systems.

Figure 7:
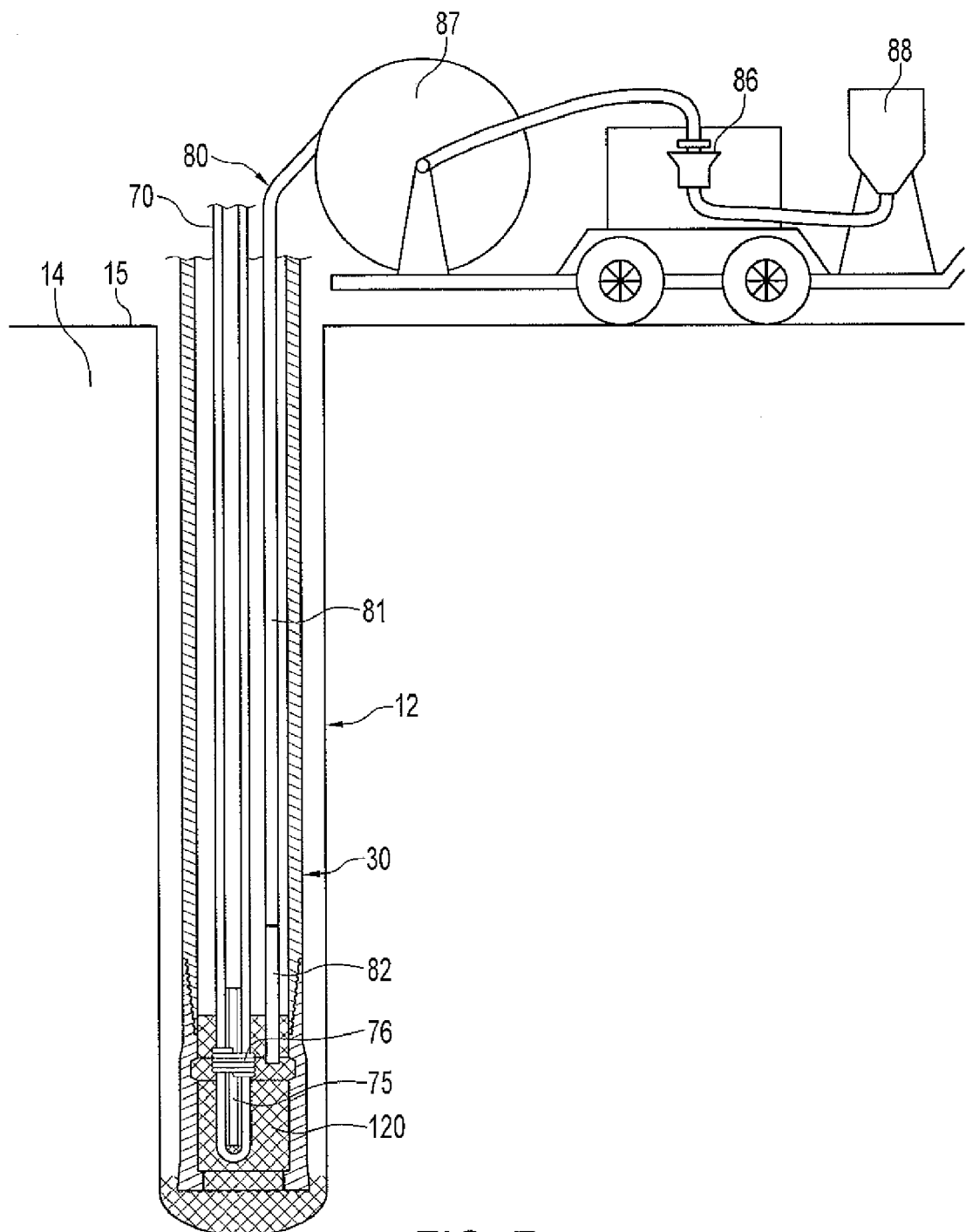
FIG. 7 is an elevation, partially in section, view illustrating a grouting rig grouting the hole of FIG. 1.
Figure 8:
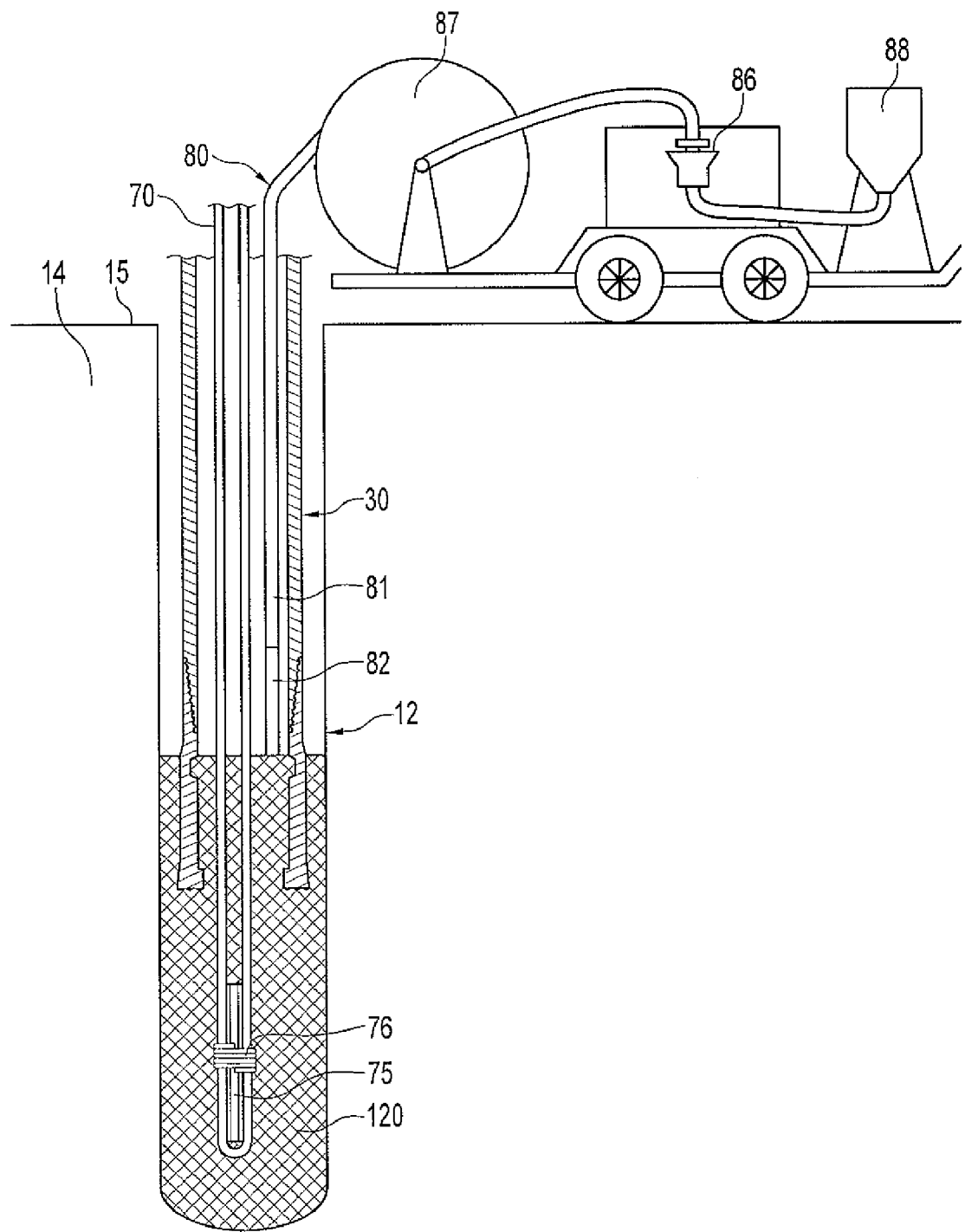
FIG. 8 is another elevation, partially in section, view illustrating the grouting rig grouting the hole of FIG. 1.

Referring now to FIGS. 7 and 8, once the geothermal transfer loop 70 has been completely lowered into the drill string 30, the hole 12 may be grouted. The hole 12 may be grouted with the drill string 30 remaining in the ground 14 or after the drill string 30 has been removed from the ground 14. In this example, grouting is accomplished by the tremie line method. A tremie line hose 80 is lowered into the hole 12. The tremie line hose is comprised of a steel pipe section 82 at a distal end and a flexible tube section 81 at a proximal end thereof. The steel pipe section 82 is the lead end of the tremie hose line 80 lowered into the hole 12. A pump 86 pumps thermally conductive grouting material 120 from a reservoir 88 along the tremie hose line 80 to the bottom of the hole 12.

Figure 9:
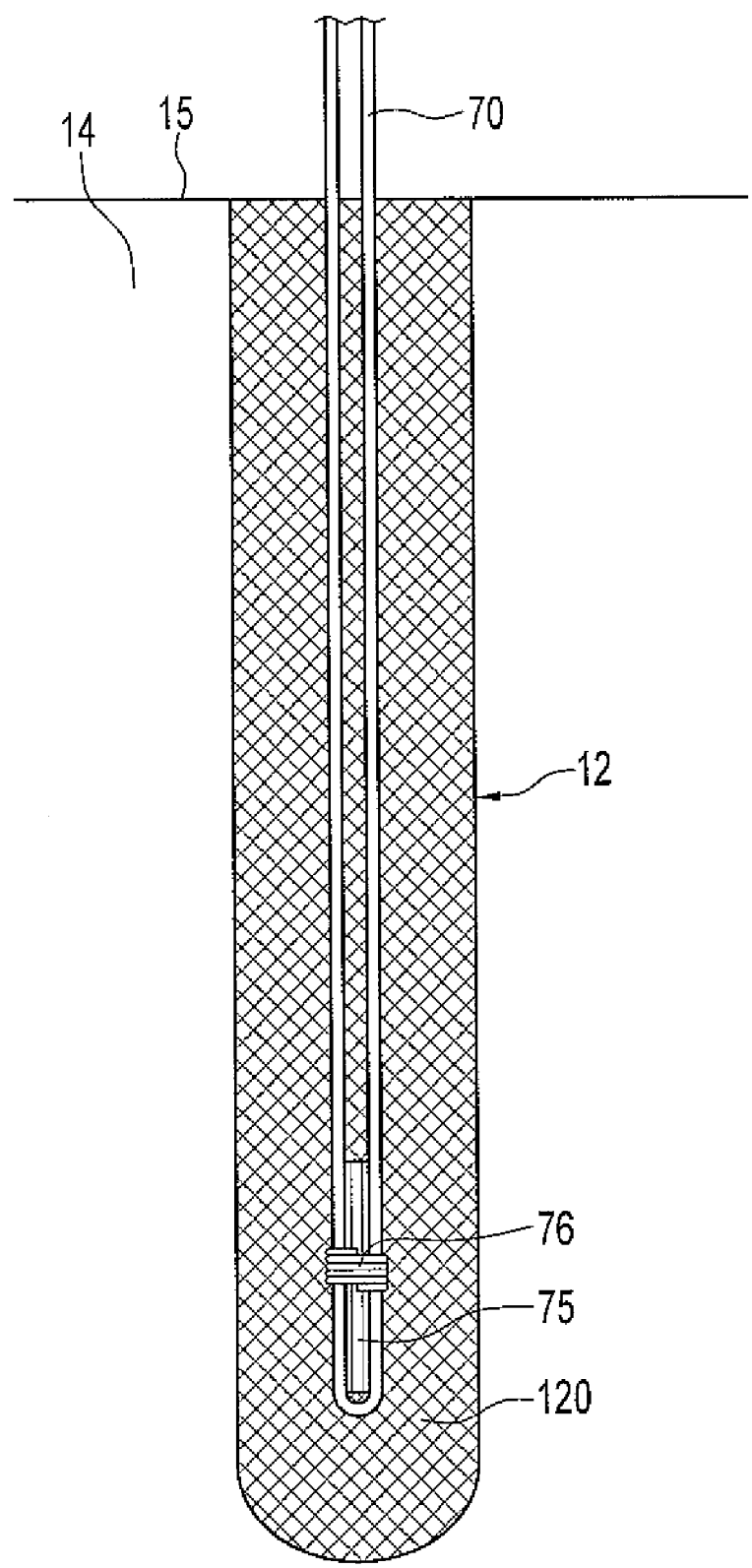
FIG. 9 is an elevation, partially in section, view showing a geothermal transfer loop in the grouted hole of FIG. 1.
Figure 10:
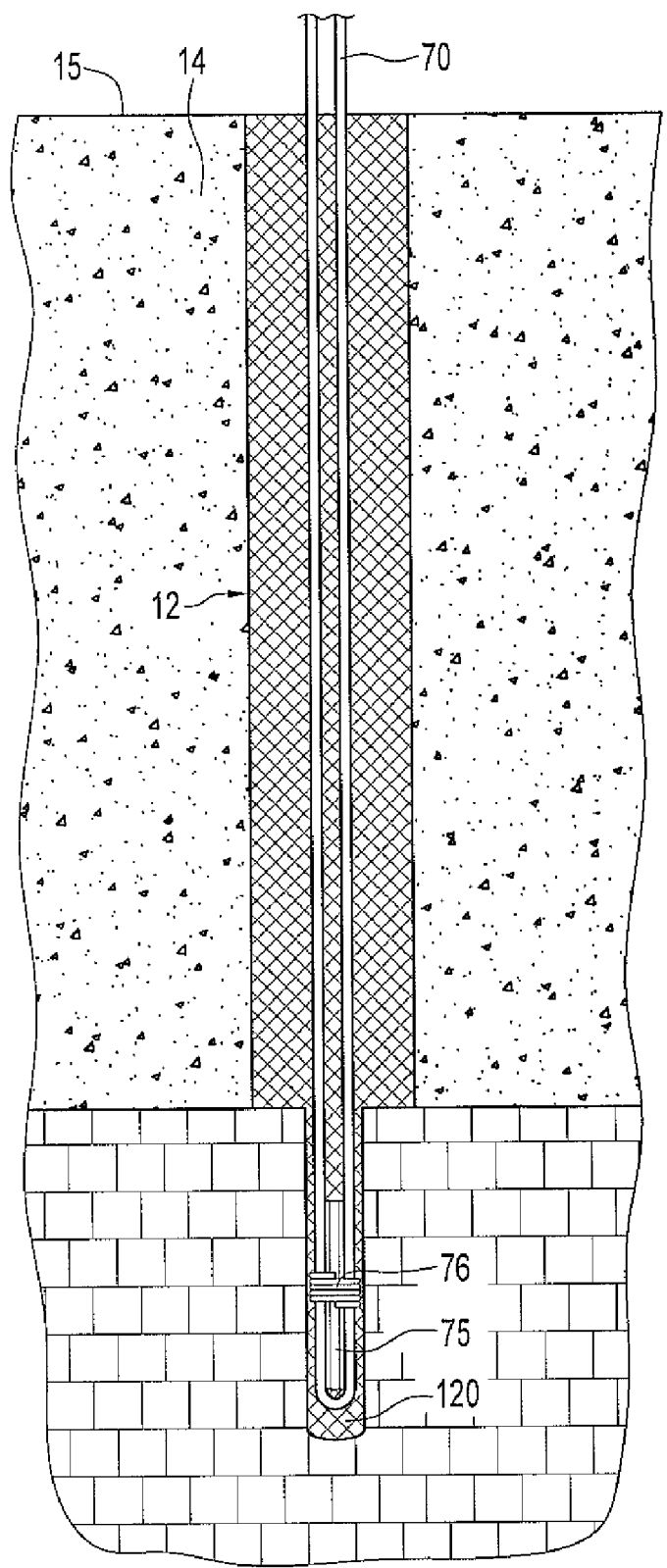
FIG. 10 is an elevation, partially in section, view showing a geothermal transfer loop in the grouted hole of FIG. 3.

The grouting material 120 encompasses the geothermal transfer apparatus 70. As the hole 12 is filled from the bottom up, a tremie line hose reel 87 pulls the tremie line hose 80 out of the hole 12, so as to maintain the lead end of the tremie line hose 80 below the grouting material 120. This process is continued until the hole 12 has been filled with grouting material 120 and the grouting material encompasses the portion of the geothermal transfer loop 70 which is below the ground surface 15 as best shown in FIGS. 9 and 10.

In other examples, grouting may be accomplished by the pressure grouting method. Pressure grouting may be accomplished by attaching a grout line to the top of the of the drill string or a grout line can be attached to the swivel on the drill head. As the drill string is removed from the ground, grouting material is simultaneously pumped into the inner space of the drill string. The grouting is topped up once the casing has been removed. In some cases grouting may not be required, for example in silty or sandy soils which collapse about the geothermal loop when the drill string is removed.

Figure 11:
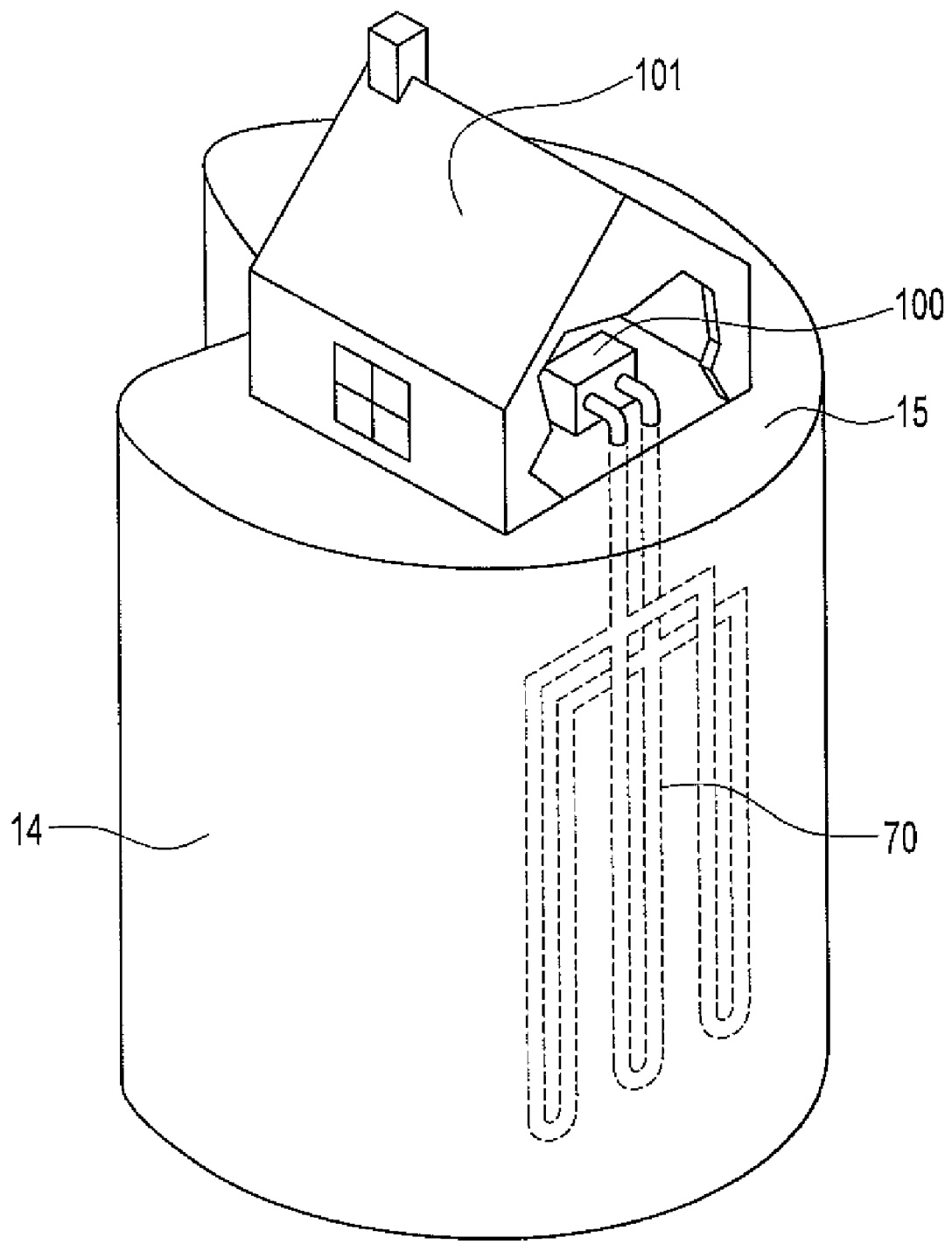
FIG. 11 is a perspective view of a heat pump coupled to the geothermal transfer loop of FIG. 9.

As shown in FIG. 11, once the grouting process is completed, either by the tremie line method or the pressure grouting method, the geothermal transfer apparatus 70 may be operatively connected to the heat pump 100 disposed within in a building 101, or other structure, housing an ambient environment, to form a geothermal heat exchange system. The geothermal transfer loop 70 may also be operatively connected below the ground surface 15, in series, to additional geothermal transfer apparatuses below the ground surface 15. The series of geothermal transfer apparatuses are then connected to a communal heat pump.

Figure 12:
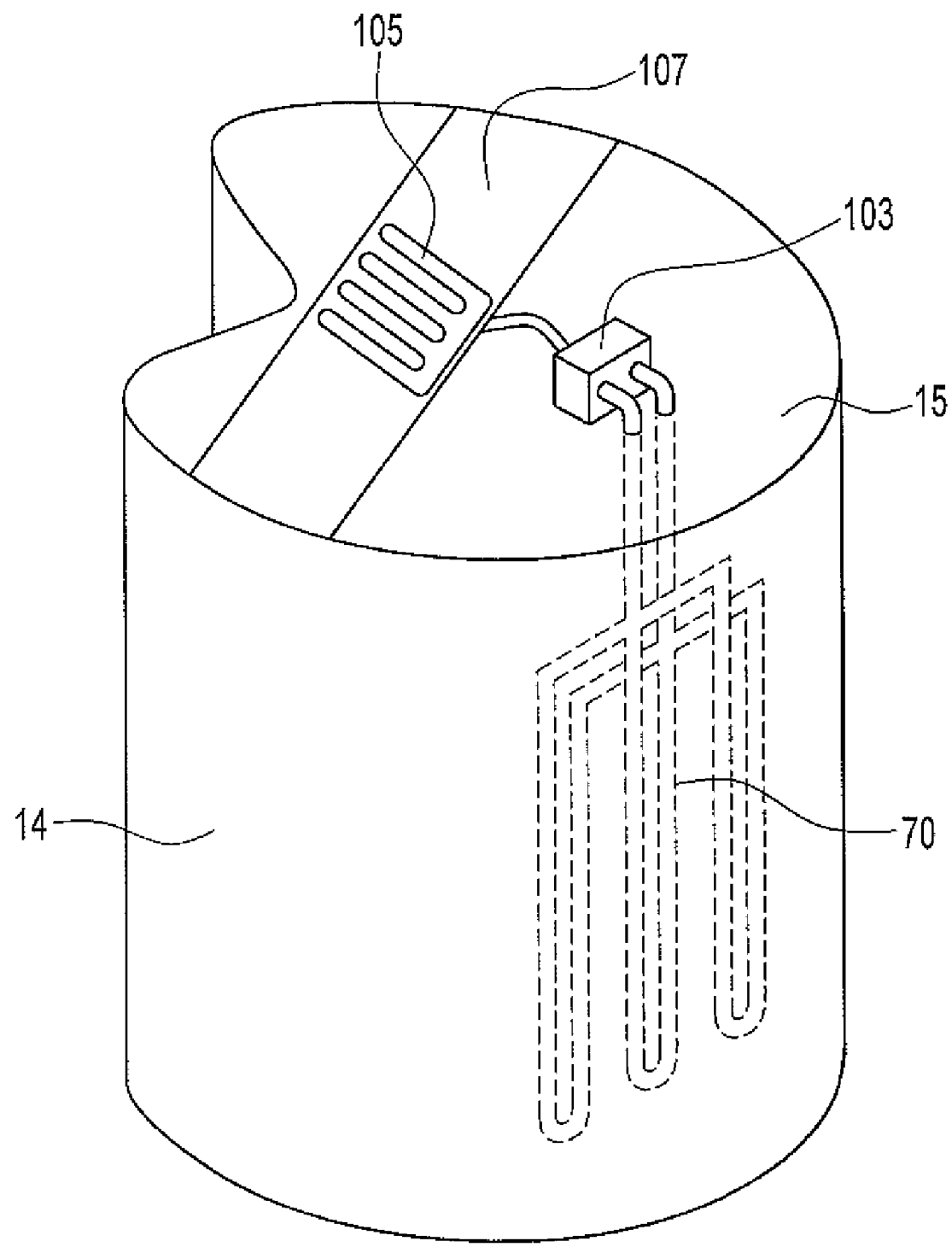
FIG. 12 is a perspective view of an underground thermal energy storage system.

Alternatively, as shown in FIG. 12, the geothermal transfer apparatus 70 may be operatively connected to a heat pump 103, which in turn is coupled to a thermal energy collector 105, to form an underground thermal energy storage system. In the example shown in FIG. 12, the geothermal energy collector 105 is a solar energy collector disposed on a roadway 107. Heat from solar radiation on the surface of the roadway 107 is collected by the thermal energy collector 105 during the summer. The heat is then pumped, by the heat pump 103, into the ground 14 where it is stored. The stored heat may later be used to melt snow or ice on the surface of the roadway 107 during the winter. In another example, heat from the ground may be used to heat cold air during the winter. This causes a lowering of the ground temperature. The lowered ground temperature may later be used to cool an ambient environment during the summer. Accordingly, both heat and cold may be stored in underground thermal energy storage systems.

Figure 13:
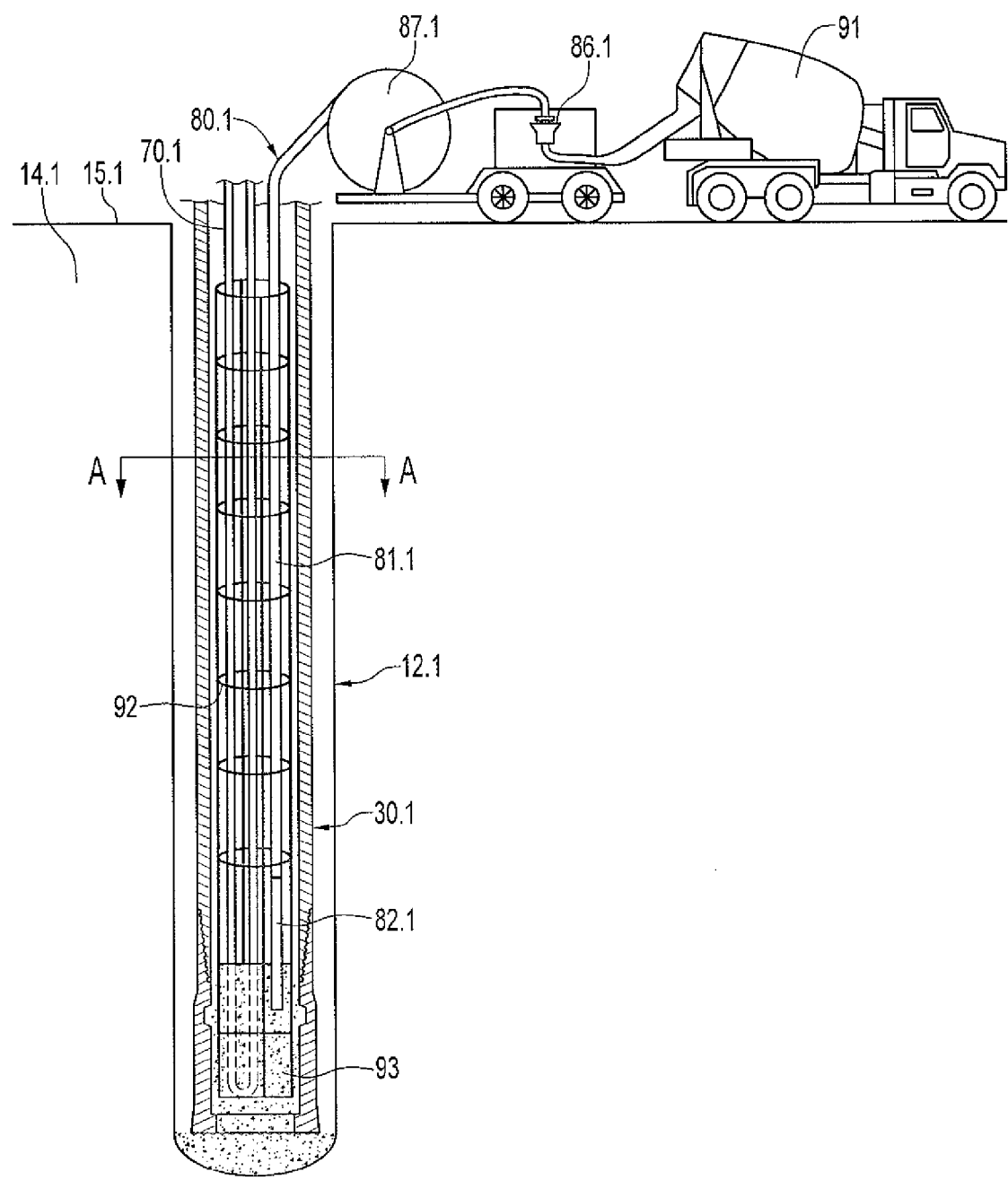
FIG. 13 is an elevation, partially in section, view of a cement truck discharging concrete into the hole of FIG. 1 during the installation of an energy pile.
Figure 14:
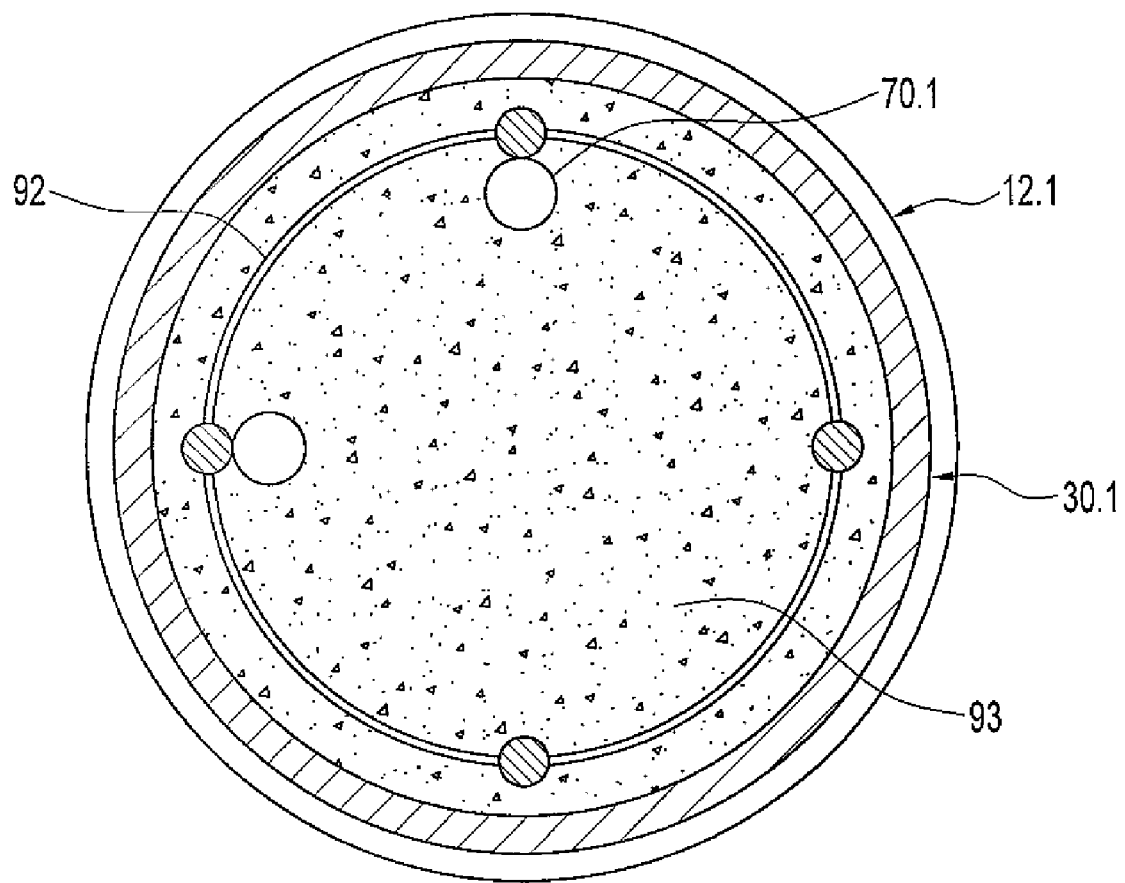
FIG. 14 is view taken along line A-A of FIG. 13.
Figure 15:
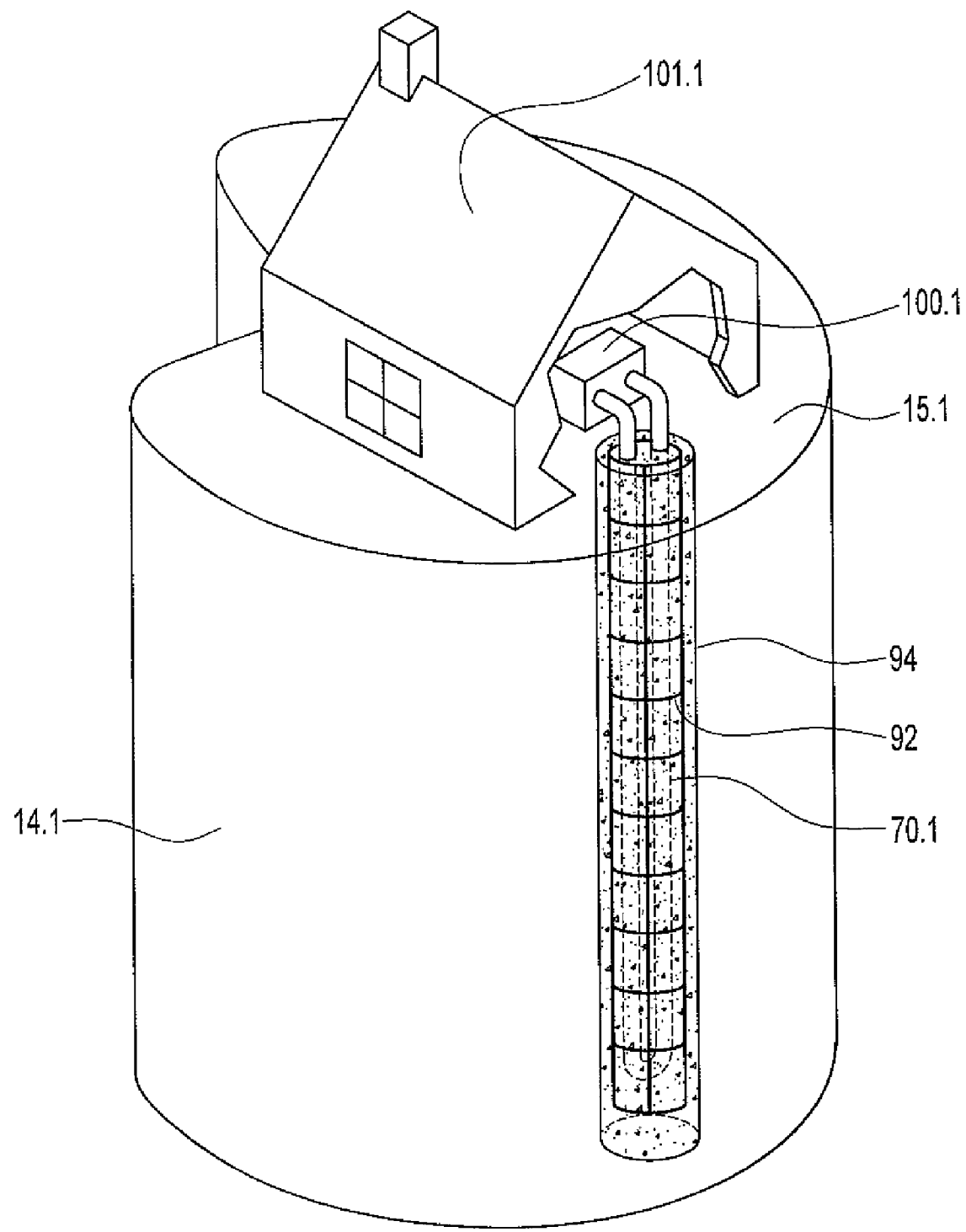
FIG. 15 is a perspective view of an energy pile.

Referring now to FIGS. 13 and 14, in another application, a geothermal transfer apparatus, in the form of a geothermal transfer loop 70.1, is fitted to a reinforced steel structure 92 and lowered into a cased hole 12.1 drilled according to the present method. In FIGS. 13 and 14 like structure and environment have been given like reference numerals as in FIGS. 7 and 8 with the additional numerical designation "0.1". In this example, the geothermal transfer apparatus is a geothermal transfer loop 70.1. However, it will be understood by a person skilled in the art that any geothermal transfer apparatus capable of transferring heat to and from the ground 14.1 may be used. In this example, once the combination of the geothermal transfer loop 70.1 and reinforced steel structure 92 are lowered into the hole 12.1 the hole 12.1 may be filled with concrete 93 by a cement truck 91 using the tremie line method, previously described herein, to form an energy pile 94 which is shown in FIG. 15. In other examples, the hole 12 may be filled with grout or other suitable matter.

In FIG. 15 like structure and environment have been given like reference numerals as in FIG. 11 with the additional numerical designation "0.1". The energy pile 94 provides foundational support to a building 101.1 and is also operatively connected to a heat pump 100.1 disposed within the building 101.1 to form a geothermal heat exchange system. Accordingly, energy piles are a cost-effective way of installing geothermal heat exchange systems in ground conditions where foundation piles are required. Presently such energy piles are being installed by Cementation Foundations Skanska of Maple Cross House, Denham Way, Maple Cross, Rickmansworth, Herts, United Kingdom, WD3 9SW.

Figure 16:
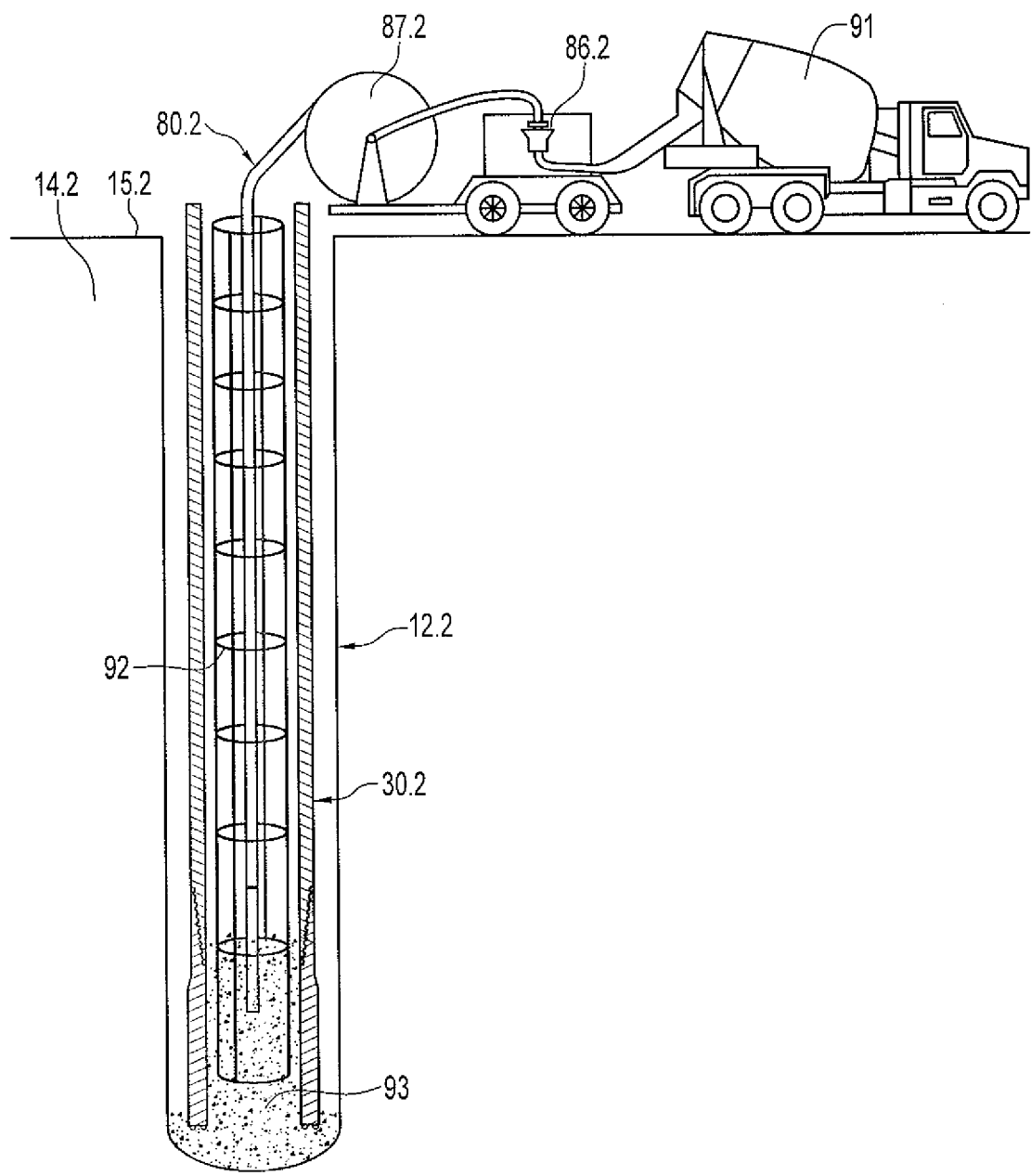
FIG. 16 is an elevation, partially in section, view of a cement truck discharging concrete into the hole of FIG. 1 during the installation of a cast-in-place concrete pile.
Figure 17:
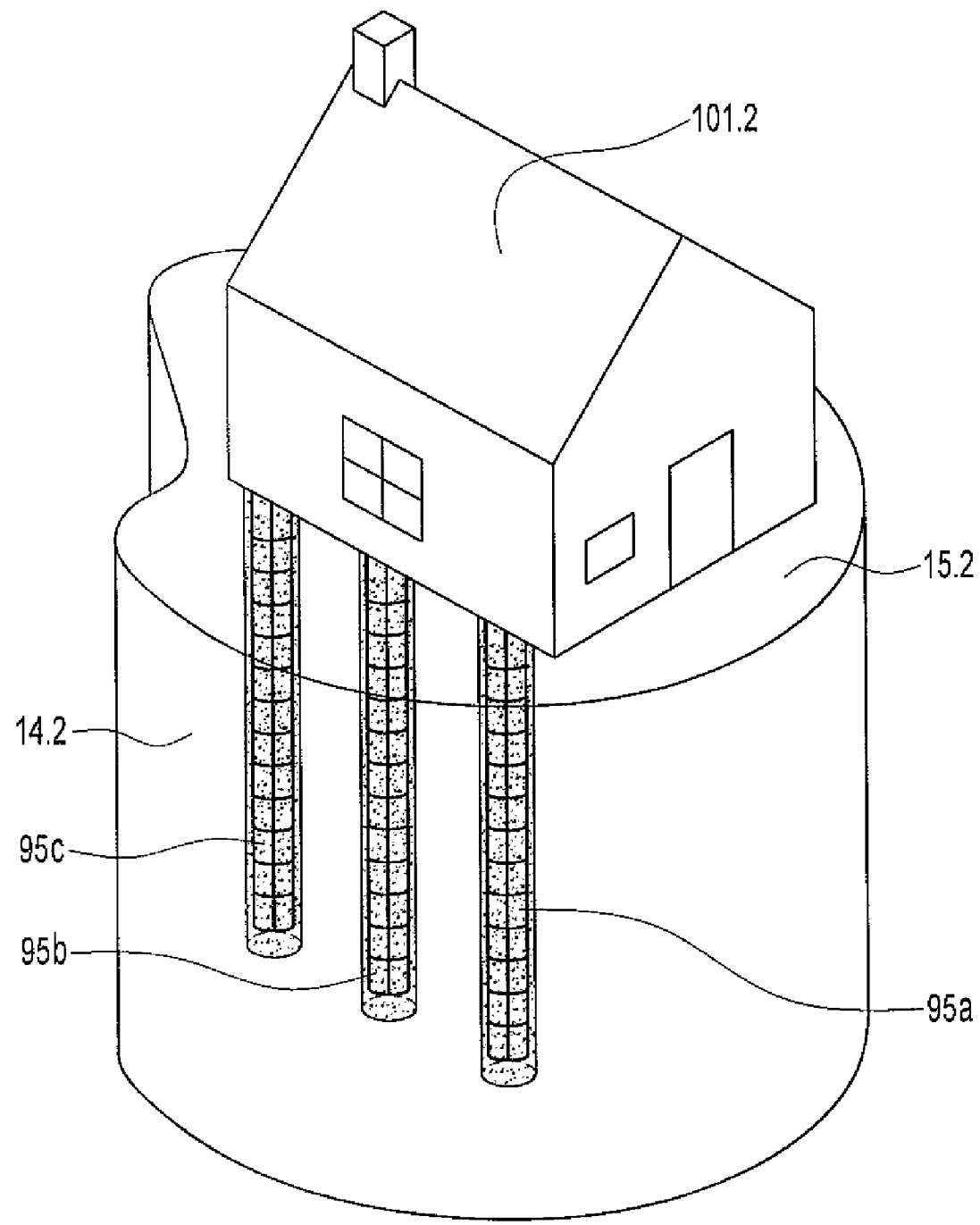
FIG. 17 is a perspective view of a cast-in-place concrete pile.

Referring now to FIGS. 16 and 17, in yet another application, a cased hole 12.2 drilled according to the present method may be filled with concrete for the installation of cast-in-place concrete piles. In FIGS. 16 and 17 like structure and environment have been given like reference numerals as in FIGS. 7 and 11, respectively, with the additional numerical designation "0.2". There are many advantages to using cast-in-place concrete piles over traditional timber piles. For example, cast-in-place concrete piles are free from decay or attack by insect or marine borers. The load capacity of concrete is also greater than that of wood. As shown in FIG. 16, once the cased hole 12.2 is drilled to a desired depth, according the above-described method, a reinforced steel structure 92 is lowered into the hole 12.2. A cement mixer 91 then discharges concrete 93 into the hole 12.2 using the tremie line method, previously described herein. When the hole 12.2 is full of concrete the drill string 30.2 is vibrated out of the hole. As the drill string 30.2 is vibrated out of the hole 12.2 the concrete 93 is forced to flow into a void created by the drill string 30 and intermingles with the surrounding soil particles creating a very strong bond after the concrete 93 has cured. The resulting cast-in-place concrete piles 95a, 95b and 95c are shown in FIG. 17 and may be used to provide foundational support for a building 101.2.

Figure 18:
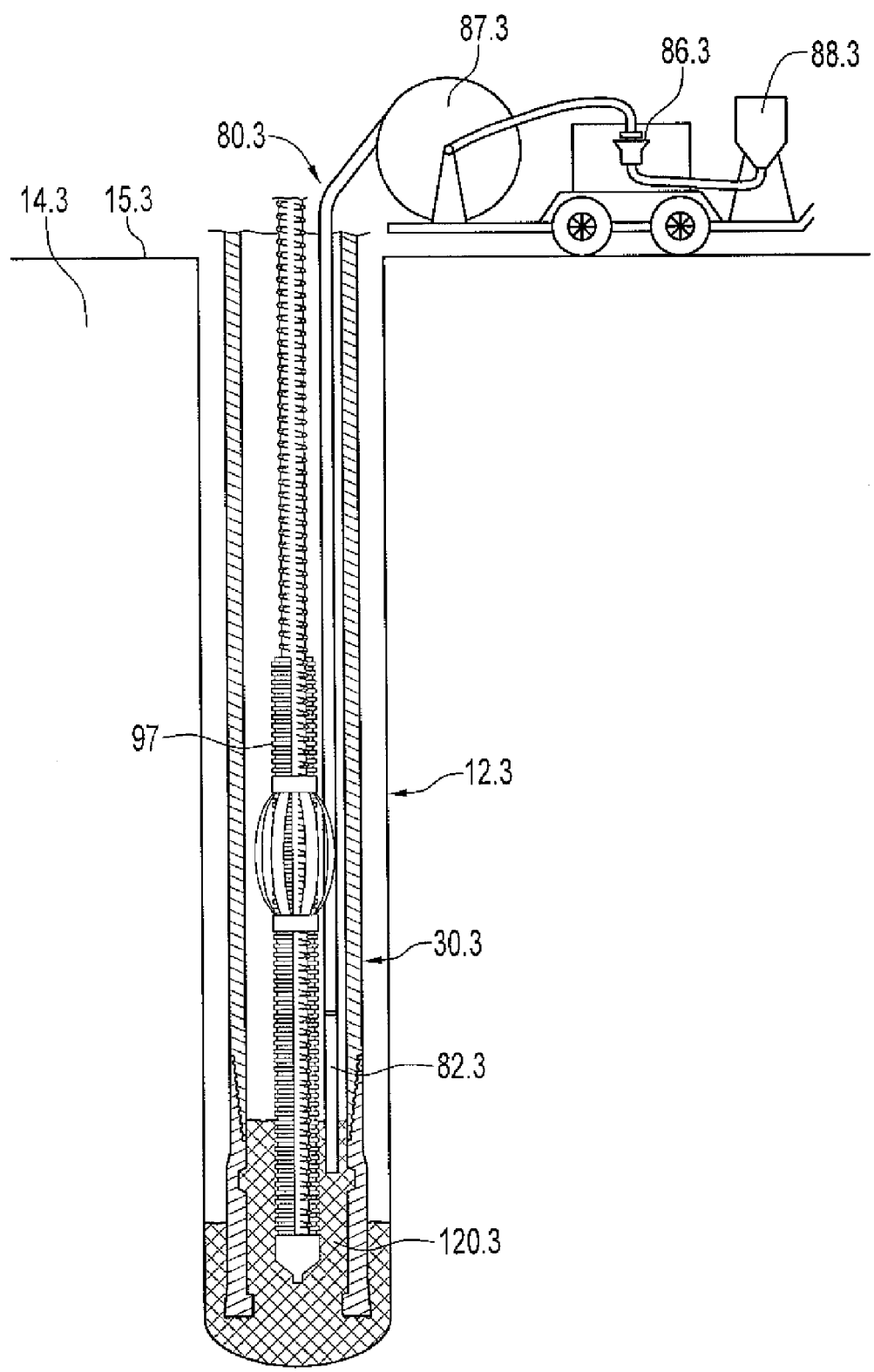
FIG. 18 is an elevation, partially in section, view of a grouting rig discharging grout into the hole of FIG. 1 during the installation of a micropile and anchor.
Figure 19:
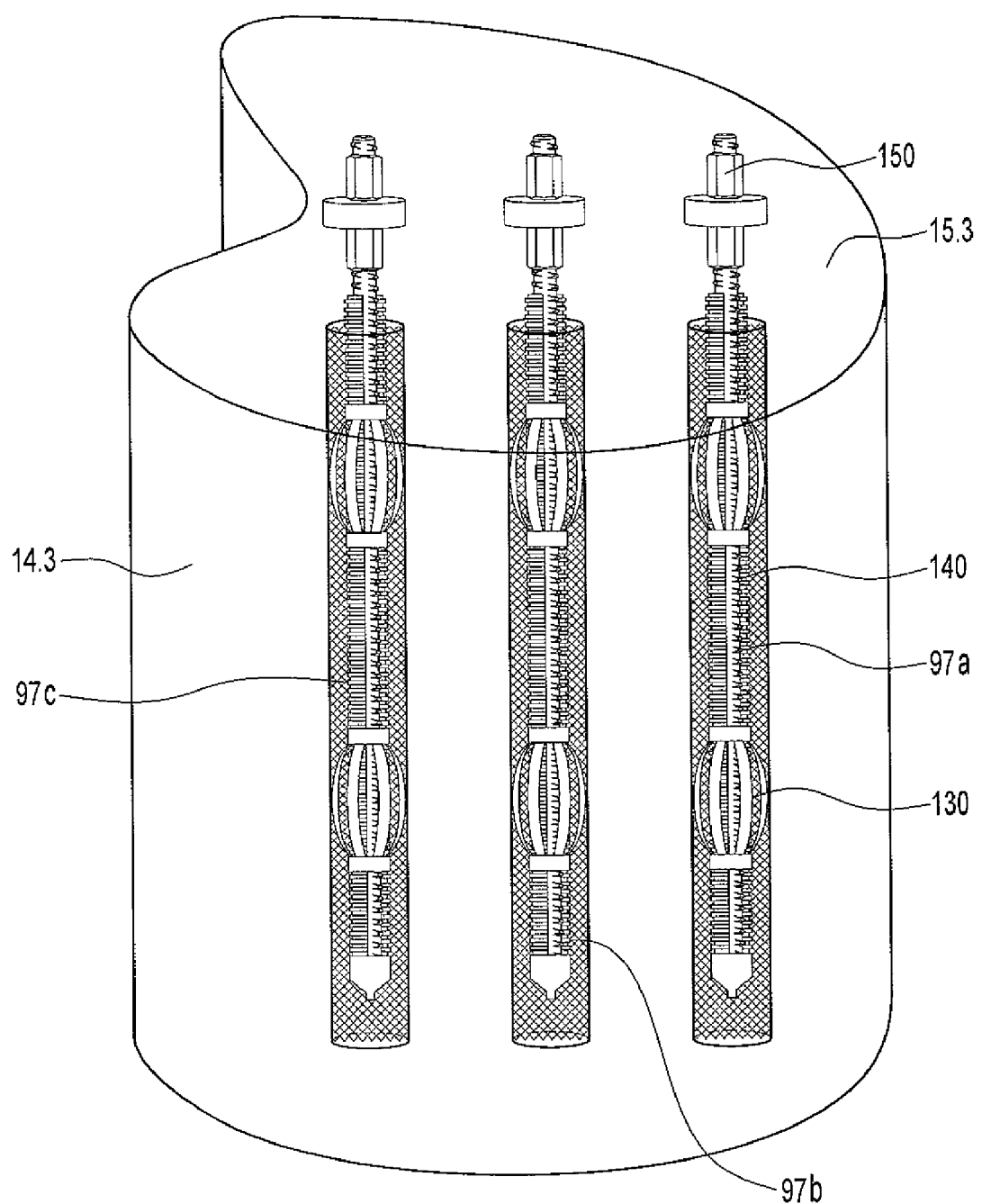
FIG. 19 is a perspective view of a micropile and anchor.

Referring now to FIGS. 18 and 19, in yet still another application, a cased hole 12.3 drilled according to the present method may be used for the installation of micropiles or minipiles. In FIGS. 18 and 19 like structure and environment have been given like reference numerals as in FIGS. 7 and 11, respectively, with the additional numerical designation "0.3". Micropiles are small diameter piles which can withstand axial and/or lateral loads. There are many advantages to using micropiles over concrete piles. For example, in concrete piles, most of the load capacity is provided by reinforced concrete. Increased load capacity is therefore achieved through increased cross-sectional and surface areas of the cast-in-place concrete piles. In contrast, micropiles rely on high-capacity steel elements to for load capacity resulting in small diameter piles which may be installed in restrictive environments.

Furthermore, as reported in Micropiles for Earth Retention and Slope Stabilization, Tom A. Armour P. E. as furnished by the ADSC. The International Association of Foundation Drilling, and the full disclosure of which is incorporated herein by reference, micropile installation allows for high grout/ground bond values along with the grout/ground interface. The grout transfers the load through friction to the ground in the micropile bond zone in a manner similar to a ground anchor. As a result, due to the small diameter of the micropile, any ending bearing contribution in micropiles is generally neglected. This provides for excellent underpinning to support structures.

As shown in FIG. 18, once the cased hole 12.3 is drilled to a desired depth, according the above-described method, a micropile 97 is lowered into the hole 12.3. A pump 86.3 then pumps grouting material 120.3 from a reservoir 88.3 using the tremie line method, previously described herein. When the hole 12.3 is full of grouting material 120.3 the drill string 30.3 is vibrated out of the hole. As the drill string 30.3 is vibrated out of the hole 12.3 the grouting material 120.3 is forced to flow into a void created by the drill string 30.3 and intermingles with the surrounding soil particles creating a very strong bond. The grouting material 120.3 also bonds with the micropile 97.

The resulting; micropiles 97a, 97b and 97c are shown in FIG. 19 and may be used to provide foundational support for a building (not shown). In this example, and as shown for one of the micropiles 97a, each of the micropiles includes an elastic spacer 130, a high capacity steel element 140, and a torqued anchor plate 150 similar to the GEWI® Pile offered by DYWIDAG-Systems International Limited of Northfield Road, Southam, Warwickshire, United Kingdom, CV47 OFG. The GEWI® Pile functions as both a micropile and anchor.

Figure 20:
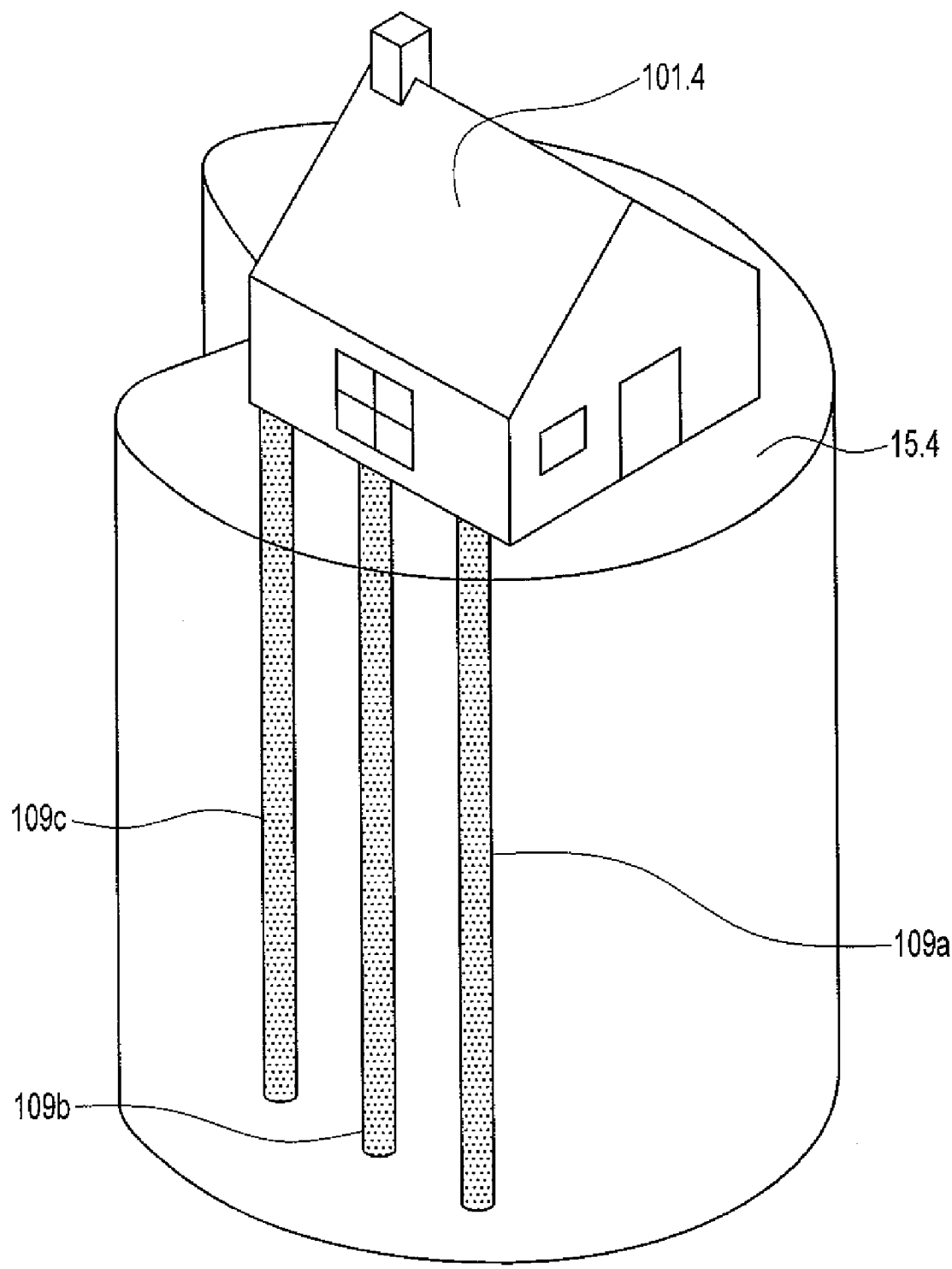
FIG. 20 is a perspective view of a micropile.

Alternatively, as shown in FIG. 20, conventional micropiles 109a, 109c, and 109c similar to the type offered by L. B. Foster of 6500 Langfield Road, Houston, Tex., United States of America 77092, may be installed to support a building 101.4 using the methods disclosed herein. In FIG. 20 like structure and environment have been given like reference numerals as in FIG. 11 with the additional numerical designation "0.4".

It will be understood by someone skilled in the art that many of the details provided above are by way of example only and can be varied or deleted without departing from the scope of the invention as set out in the following claims.

I claim:

1. A method for drilling a cased hole and installing a micropile, the method comprising:
   positioning a sonic drilling apparatus at a desired location, the sonic drilling apparatus including a rotating and vibrating apparatus for rotating and vibrating a hollow drill string into the ground, the hollow drill string having an inner space;
   drilling the cased hole to a desired depth by rotating and vibrating the drill string into the ground and discharging a fluid into the inner space of the hollow drill string; and
   lowering the micropile into the cased hole following the drilling of the cased hole to the desired depth and removing the drill string from the ground.

2. The method as claimed in claim 1 further including discharging grouting material into the cased hole following the lowering of the micropile into the cased hole.

3. The method claimed in claim 1 further including simultaneously vibrating the drill string out of the ground and discharging grouting material into the cased hole, following the lowering of the micropile into the cased hole.

4. The method as claimed in claim 1 further including discharging sufficient fluid into the inner space of the hollow drill string to keep the inner space clear of debris.

5. The method as claimed in claim 1 further including discharging sufficient fluid into the inner space of the hollow drill string to either carry debris up an outside of the hollow drill string to the ground surface or push debris into the ground.

6. The method as claimed in claim 1 further including oscillating the fluid to provide an additional drilling force.

7. A system for drilling a hole and installing a micropile, the system comprising:

a sonic drilling apparatus including a rotating and vibrating apparatus for rotating and vibrating a hollow drill string into the ground, the hollow drill string having an inner space;

a fluid discharging apparatus for discharging a fluid into the inner space of the hollow drill string; a micropile for lowering into the inner space of the hollow drill string; and a grouting apparatus for discharging grouting material to encompass the micropile.

8. The system claimed in claim 7 wherein the fluid discharging apparatus and the drilling apparatus operate simultaneously.

* * * * *